(12) United States Patent
Liu et al.

(10) Patent No.: US 10,249,442 B2
(45) Date of Patent: Apr. 2, 2019

(54) METHOD FOR MANUFACTURING HIGH-VOLTAGE SOLID ELECTROLYTE ALUMINUM-ELECTROLYTIC CAPACITOR

(71) Applicant: Zhaoqing Beryl Electronic Technology Co., Ltd., Zhaoqing (CN)

(72) Inventors: Yongpeng Liu, Zhaoqing (CN); Yanbin Ma, Zhaoqing (CN); Ping Zheng, Zhaoqing (CN); Wei Luo, Zhaoqing (CN); Dirong Wu, Zhaoqing (CN); Qiong Liao, Zhaoqing (CN); Yong Yuan, Zhaoqing (CN); Huifeng Li, Zhaoqing (CN); Weiqiao Wu, Zhaoqing (CN)

(73) Assignee: Zhaoqing Beryl Electronic Technology Co., Ltd. (CN)

( * ) Notice: Subject to any disclaimer, the term of this patent is extended or adjusted under 35 U.S.C. 154(b) by 0 days.

(21) Appl. No.: 16/105,664

(22) Filed: Aug. 20, 2018

(65) Prior Publication Data

US 2018/0366274 A1    Dec. 20, 2018

Related U.S. Application Data

(63) Continuation of application No. 15/548,975, filed as application No. PCT/CN2015/073531 on Mar. 3, 2015, now Pat. No. 10,090,111.

(30) Foreign Application Priority Data

Feb. 6, 2015    (CN) .......................... 2015 1 0064074

(51) Int. Cl.
H01G 9/00    (2006.01)
H01G 9/15    (2006.01)

(52) U.S. Cl.
CPC ............ H01G 9/0029 (2013.01); H01G 9/15 (2013.01)

(58) Field of Classification Search
CPC .................................................... H01G 9/0029
See application file for complete search history.

(56) References Cited

U.S. PATENT DOCUMENTS

| 6,882,519 | B2 | 4/2005 | Uzawa et al. | |
| 10,090,111 | B2 * | 10/2018 | Liu | .......................... H01G 9/15 |
| 2018/0025846 | A1 * | 1/2018 | Liu | ...................... H01G 9/0029 29/25.03 |

FOREIGN PATENT DOCUMENTS

| CN | 1773640 | A | 5/2006 |
| CN | 101894672 | A | 11/2010 |
| CN | 102779654 | A | 11/2012 |
| CN | 103280332 | A | 9/2013 |
| WO | 2014186439 | A1 | 11/2014 |

OTHER PUBLICATIONS

International Search Report for PCT/CN2015/073531 dated Jun. 26, 2015.

* cited by examiner

*Primary Examiner* — Seahvosh Nikmanesh
(74) *Attorney, Agent, or Firm* — Lerner, David, Littenberg, Krumholz & Mentlik, LLP

(57) ABSTRACT

A method for manufacturing a solid electrolyte aluminum-electrolytic capacitor, includes: (1) welding a capacitor core of a capacitor onto an iron bar, applying a voltage for chemical treatment, and thereafter, washing and drying the capacitor core; (2) impregnating the dried capacitor core in a dispersion B for 1~30 minutes; (3) removing the capacitor core, creating a vacuum and then impregnating the capacitor core in the dispersion B for 1~10 minutes; (4) while in the dispersion B, breaking the vacuum and performing pressurization for 1~10 minutes; (5) while in the dispersion B, performing depressurization to atmospheric pressure, for 1~10 minutes; (6) placing the capacitor core in a temperature of 50~100° C. and drying for 20~60 minutes, and then in a temperature of 110~200° C. and drying for 20~60 minutes; (7) impregnating the dried capacitor core in a dispersion C for 1~30 minutes; (8) placing the capacitor core in a temperature of 65~100° C. and drying for 20~60 minutes, and then in a temperature of 135~165° C. and drying for 20~60 minutes; and (9) Repeating steps (3) to (8) at least once.

6 Claims, No Drawings

METHOD FOR MANUFACTURING HIGH-VOLTAGE SOLID ELECTROLYTE ALUMINUM-ELECTROLYTIC CAPACITOR

CROSS REFERENCE TO RELATED APPLICATIONS

The present application is a continuation of U.S. patent application Ser. No. 15/548,975, filed Aug. 4, 2017 which claims priority from International Application No. PCT/CN2015/073531, filed Mar. 3, 2015, which claims priority from Chinese Patent Application No. 201510064074.6 filed Feb. 6, 2015, all of which are hereby incorporated herein by reference.

TECHNICAL FIELD

The present invention relates to the technical field of preparing an electrolytic capacitor, and in particular, to a method for manufacturing a high-voltage solid electrolyte aluminum-electrolytic capacitor.

BACKGROUND

Compared with an tranditional liquid electrolytic capacitor, a solid electrolytic capacitor has advantages such as prominent electrical performance, a low equivalent series resistance (ESR), a highly ripple-tolerant current, a long life, and stable performance Continual upgrading of electronic products brings higher functionality and performance and also imposes higher requirements on high-frequency characteristics of the capacitor. People reduce the ESR of the solid electrolytic capacitor by different means to satisfy the high-frequency characteristics of the capacitor.

However, although the solid capacitor has its irreplaceable advantages, the current state of the art has two main problems. One problem is that the voltage of a product cannot be too high and could not be as high as 35V, and the other problem is that the leakage current of the product is high enough to exceed 0.05 CV. Reasons for such problems are: During the process of manufacturing a solid capacitor, monomers and oxidants are generally dissolved by using a solvent, and enter a capacitor core by means of impregnating, and then are polymerized under specific conditions to generate a conductive solid electrolyte. This manufacturing process has two disadvantages. One disadvantage is that the oxidant itself is highly acidic and strongly damages the oxidiation film of the positive electrode foil, thereby significantly reducing the original voltage value of the positive electrode foil. The other disadvantage is that the monomers and the oxidant are dissolved in the solvent and infiltrate the capacitor core, and as the positive electrode foil is well impregnated in the solvent, the oxidant and the monomers are brought into etched pores of the anodized foil. The pores, where the oxide film is generated in the chemical treatment process, are fragile, plus the solid electrolyte is not repairable, hence, the withstand voltage of the pores is low. When a specific voltage is applied, a high leakage current is generated and leads to failure of the product.

A technical solution to this problem is to polymerize a conductive polymer in water to form a water dispersion, and then the conductive polymer infiltrates the capacitor core by impregnating. A capacitor formed in this way prevents the oxidant from impairing the foil, so that the withstand voltage of the product is higher. In addition, molecules of the polymer dispersed in the water have a specific size. Because the polymer is dispersed in the water and the water generally provides a lower impregnation effect than the solvent, it is ensured that the conductive polymer infiltrates the pores of the positive electrode foil. Due to the presence of polymers, the fragile pores with a low withstand voltage prevent substantial electric leakage, so that the withstand voltage of the product is much higher.

In the current state-of-the-art, because an ordinary impregnation manner is applied without considering the low impregnation effect of water, the capacitance withdrawing rate of the product is low, it is difficult to make a product of a larger size, for example, larger than $\Phi 10*12$ mm, or product consistency is low.

SUMMARY

To overcome disadvantages in the prior art, the present invention provides a method for manufacturing a high-voltage solid electrolyte capacitor. This method implements thorough impregnation of a capacitor core by impregnating the capacitor core under different pressure conditions. By repeating steps, it is ensured that many polymers exist in impregnated areas and are evenly distributed to obtain stable conductive polymers. Especially this method is indispensible for making a product of a larger size, for example, larger than $\Phi 10*12$ mm. This manufacturing method may be performed to obtain a solid capacitor of a lower ESR value and a higher withstand voltage, obtain a lower leakage current, and obtain better batch consistency.

The following technical solutions of the present invention are used to resolve the foregoing technical problems:

The present invention provides a method for manufacturing a high-voltage solid electrolyte aluminum-electrolytic capacitor, including:

(1) welding a capacitor core of a capacitor onto an iron bar, applying a voltage for chemical treatment, and after the chemical treatment, washing and drying the capacitor core;

(2) impregnating the dried capacitor core in a dispersion A for 1~30 minutes;

(3) removing the capacitor core out of the dispersion A, creating a vacuum and then impregnating the capacitor core in the dispersion A for 1~10 minutes;

(4) keeping the capacitor core in the dispersion A, breaking the vacuum and then performing pressurization, and keeping the pressurized state for 1~10 minutes;

(5) keeping the capacitor core in the dispersion A, performing depressurization to an atmospheric pressure, and keeping the atmospheric pressure for 1~10 minutes;

(6) taking the capacitor core out, placing the capacitor core in a temperature of 65~100° C. and drying it for 20~60 minutes, and then placing the capacitor core in a temperature of 135~165° C. and drying it for 20~60 minutes;

(7) repeating steps (3) to (6) at least once; and (8) putting the capacitor core in an aluminum cover and sealing it, and performing aging treatment to obtain a high-voltage solid electrolyte aluminum-electrolytic capacitor.

The dispersion A is a dispersion that includes conductive polymers.

Further, the vacuum degree of the vacuum created in step (3) is 700~970 Pa.

Further, the pressurizing in step (4) refers to feeding compressed air until 0.1~0.6 MPa.

Further, step (7) is to repeat steps (3) to (6) five times.

Further, step (7) is to repeat steps (3) to (6) ten times.

Further, the conductive polymers are poly (3,4-ethylene dioxythiophene).

Further, the capacitor core in step (2) is formed by winding Asahi Kasei ADS040060 electrolytic paper between a JCC anodized foil and a Nanofoil cathode foil.

Further, the manufacturing method includes:

(1) welding a capacitor core of a capacitor onto an iron bar, applying a voltage for chemical treatment, and after the chemical treatment, washing and drying the capacitor core;

(2) impregnating the dried capacitor core in a dispersion A for 15 minutes;

(3) removing the capacitor core out of the dispersion A, creating a vacuum to reach an 850 Pa vacuum state and then impregnating the capacitor core in the dispersion A for 5 minutes;

(4) keeping the capacitor core in the dispersion A, breaking the vacuum and then feeding compressed air until 0.5 MPa, and keeping the pressurized state for 5 minutes;

(5) keeping the capacitor core in the dispersion A, performing depressurization to an atmospheric pressure state, and keeping the atmospheric pressure state for 5 minutes;

(6) taking the capacitor core out, placing the capacitor core in a low temperature of 85° C. and drying it for 60 minutes, then placing the capacitor core in a high temperature of 150° C. and drying it for 30 minutes, and taking the capacitor core out;

(7) repeating steps (3) to (6) five times; and (8) putting the capacitor core in an aluminum cover and sealing it, and performing aging treatment to obtain a high-voltage solid electrolyte aluminum-electrolytic capacitor.

The dispersion A is a dispersion that includes conductive polymers.

Further, the drying in step (1) is specifically: Drying the capacitor core in a low temperature of 50~100° C. for 20~100 minutes first, and then drying it in a high temperature of 110~200° C. for 20~60 minutes.

Compared with the prior art, the present invention brings the following beneficial effects:

(1) In the present invention, when the capacitor core is impregnated in the dispersion under multiple pressure conditions such as atmospheric pressure, vacuum and pressurization, the electrolyte in the dispersion can more sufficiently generate a stable conductive polymer layer on the surface of the foil, thereby improving electrical performance of the capacitor. In addition, as a solid electrolyte, the polymer dispersion can effectively increase the withstand voltage of the solid electrolyte aluminum-electrolytic capacitor.

(2) In the present invention, the impregnation steps are repeated many times, and by means of heat treatment, an impregnating solvent is removed out of the capacitor core, which is conducive to absorption of an impregnating fluid in next impregnation. In this way, a high-voltage solid electrolyte aluminum-electrolytic capacitor of a lower ESR value can be obtained, the capacitance withdrawing rate is improved, and product consistency is improved while loss is reduced.

DESCRIPTION OF EMBODIMENTS

The following clearly and comprehensively describes the technical solutions of the present invention with reference to embodiments of the present invention. Apparently, the described embodiments are merely part but not all of the embodiments of the present invention. All other embodiments obtained by a person of ordinary skill in the art based on the embodiments of the present invention without creative efforts shall fall within the protection scope of the present invention.

The present invention provides a solid electrolyte aluminum-electrolytic capacitor, including an aluminum cover and a capacitor core disposed in the aluminum cover. The capacitor core is connected to a positive electrode terminal and a negative electrode terminal, and outer surfaces of the positive electrode terminal and the negative electrode terminal are coated with a silver plating layer. A rubber cover or a rubber plug is disposed above the capacitor core. The capacitor core includes an anodized aluminum foil, a cathode foil, and electrolytic paper and a solid electrolyte between the anodized aluminum foil and the cathode foil. The solid electrolyte may be a conductive polymer, or may be a composite material that combines a conductive polymer and a conductive carbon material. The solid electrolyte is a result of polymerizing by impregnating in the conductive polymer and/or a conductive carbon material dispersion.

Preferably but not restrictively, the anodized aluminum foil is a JCC anodized foil manufactured by Japan Capacitor Industrial Co., Ltd, the model of the anodized aluminum foil is HGF110J16-365VF-1.33 µF, and it is 17 mm in width and 491 mm in length; the cathode foil is a Nanofoil cathode foil, the model of the cathode foil is NF3000, and it is 17 mm in width and 521 mm in length; and the electrolytic paper is Asahi Kasei DS040060 that is 20 mm in width.

Preferably but not restrictively, the solid electrolyte may be a conductive polymer, or may be a physical mixture or composition of a conductive polymer and a conductive carbon material. The conductive polymer and the conductive carbon material may be mixed into the solid electrolyte, or the conductive polymer and the conductive carbon material are laminated into the solid electrolyte, but the present invention is not limited thereto.

A dispersion A and a dispersion C used in the present invention are respectively a dispersion inclusive of a conductive polymer and a dispersion inclusive of a conductive carbon material; and a dispersion B is a dispersion inclusive of both a conductive polymer and a conductive carbon material.

Preferably but not restrictively, the conductive polymer is polyaniline and/or polypyrrole and/or polythiophene and/or poly (3,4-ethylene dioxythiophene). For a method for preparing the conductive polymer dispersion, that is, the dispersion A, refer to Chinese patent CN 101309949B, and the method is not described herein in detail. A concentration of the conductive polymer is preferably but not limited to 2~3% (a weight percentage).

Preferably but not restrictively, the conductive carbon material is a carbon nanomaterial or a carbon nanocomposite. With respect to the size of the conductive carbon material, a graphene particle size is preferably less than 200 nm, and a carbon nanotube length is 2~200 nm. The carbon nanomaterial is a carbon nanotube or graphene; and an active material in the carbon nanocomposite is one or more of the following: a conductive polymer, a metal oxide, a mixture of conductive polymers, a mixture of a conductive polymer and a metal oxide, a mixture of metal oxides, a composite of conductive polymers, a composite of a conductive polymer and a metal oxide, and a composite of metal oxides.

Preferably but not restrictively, an ethanol solution is placed in a high-speed shearing machine that shears at a speed of 20000 rpm. The graphene or carbon nanotube or carbon nanocomposite is slowly added into an alcohol solution that is being stirred. The stirring time is controlled to be at least 30 minutes, so that a dispersion inclusive of the conductive carbon material, that is, the dispersion C, is prepared. The concentration of the alcohol dispersion inclusive of the conductive carbon material is controlled to be 0.5~5% (a weight percentage), and a proper amount of a dispersing agent such as sodium dodecyl sulfate (SDS) or sodium dodecylbenzenesulfonate (SDBS) may be added in the dispersion.

Preferably but not restrictively, an ethanol solution is placed in a high-speed shearing machine that shears at a speed of 20000 rpm. The graphene or carbon nanotube or carbon nanocomposite is slowly added into an alcohol solution that is being stirred. The concentration of the conductive carbon material is controlled to be 0.5~5% (a weight percentage). Then a conductive polymer is added, whose concentration may be controlled to be 2~3% (a weight percentage). The stirring time is controlled to be at least 30 minutes, so that a dispersion inclusive of the conductive carbon material and the conductive polymer, that is, the dispersion B, is prepared. In addition, a proper amount of a dispersing agent such as sodium dodecyl sulfate (SDS) or sodium dodecylbenzenesulfonate (SDBS) may be added.

The present invention provides a method for manufacturing a solid electrolyte aluminum-electrolytic capacitor, in which a solid electrolyte is a conductive polymer. The manufacturing method specifically includes the following steps:

(1) Winding electrolytic paper between an anodized aluminum foil and a cathode foil into a capacitor core, welding an anode of the capacitor core onto an iron bar, and impregnating the capacitor core in a forming agent. According to a voltage of a positive foil, applying a specific voltage for at least 20 minutes, where the forming agent may be a phosphoric acid forming agent, a boric acid forming agent or an ammonium adipate forming agent.

After the chemical treatment, impregnating the capacitor core in 40~100° C. pure water for 30~60 minutes, removing residual ingredients in the forming agent, and then drying. The drying includes two steps. The first step is low-temperature drying, in which the temperature for drying is controlled within 50~100° C. If the temperature is too low, the effect of drying is degraded; if the temperature for drying is higher than 100° C., liquid may boil in the product, which affects product features. The drying time continues for 20~100 minutes to prevent enough water for boiling in the capacitor core. The temperature for drying in the second step is 110~200° C. to ensure full volatilization of residual moisture. Too high temperature should be avoided because they may damage a lead electrode and tin melting. The drying time continues for 20~60 minutes. If the drying time is too short, residual moisture may remain, which may affect next impregnation and product features. If the drying time is too long, an anodized foil of the product may be degraded, which affects product performance.

(2) Impregnating the dried capacitor core in a dispersion A for 1~30 minutes.

(3) Removing the capacitor core out of the dispersion A, creating a vacuum for the capacitor core and the dispersion A together to reach a 700~970 Pa vacuum state and then impregnating the capacitor core in the dispersion A for 1~10 minutes.

(4) Keeping the capacitor core in the dispersion A, breaking the vacuum and then feeding compressed air for pressurization until 0.1~0.6 MPa, and keeping the pressurized state for 1~10 minutes.

(5) Keeping the capacitor core in the dispersion A, performing depressurization to an atmospheric pressure state, and keeping the atmospheric pressure state for 1~10 minutes.

(6) Taking the capacitor core out, placing the capacitor core in a temperature of 50~100° C. and drying it for 20~60 minutes (preferably but not limited to 85° C.), then placing the capacitor core in a temperature of 110~200° C. and drying it for 20~60 minutes (preferably but not limited to 150° C.), and taking the capacitor core out.

(7) Repeating steps (3) to (6) at least once, preferably but not limited to five times. With little solid content of polymers included in the dispersion A, few polymers are adsorbed onto the capacitor core if the capacitor core is impregnated only once, which may affect product consistency, slightly increase the ESR, and increase the loss. If the solid content is too low, the product life is hardly ensured. The impregnation may be performed repeatedly according to actual needs.

(8) Putting the capacitor core in an aluminum cover, sealing the capacitor core with a rubber plug, and performing aging treatment to obtain a solid electrolyte aluminum-electrolytic capacitor. An aging method is: Placing the capacitor in an 85~150° C. environment, applying a 0.2× rated voltage for 20~100 minutes, then applying a 0.5× rated voltage for 20~100 minutes, then applying a 0.8× rated voltage for 20~100 minutes, then applying a 1.0× rated voltage for 20~100 minutes, and then applying a 1.2× rated voltage for 20~100 minutes.

The present invention provides another method for manufacturing a solid electrolyte aluminum-electrolytic capacitor, in which a solid electrolyte is a conductive polymer and a conductive carbon material. The manufacturing method specifically includes the following steps:

(1) Winding electrolytic paper between an anodized aluminum foil and a cathode foil into a capacitor core, welding an anode of the capacitor core onto an iron bar, and impregnating the capacitor core in a forming agent. According to a voltage of a positive foil, applying a specific voltage for at least 20 minutes. After the chemical treatment, impregnating the capacitor core in 40~100° C. pure water for 30~60 minutes, removing residual ingredients in the forming agent, then drying the capacitor core in a low temperature of 50~100° C. for 20~100 minutes, and then drying it in a high temperature of 110~200° C. for 20~60 minutes.

(2) Impregnating the dried capacitor core in a dispersion B for 1~30 minutes.

(3) Removing the capacitor core out of the dispersion B, creating a vacuum for the capacitor core and the dispersion together to reach a 700~970 Pa vacuum state and then impregnating the capacitor core in the dispersion B for 1~10 minutes.

(4) Keeping the capacitor core in the dispersion B, breaking the vacuum and then feeding compressed air for pressurization until 0.1~0.6 MPa, and keeping the pressurized state for 1~10 minutes.

(5) Keeping the capacitor core in the dispersion B, performing depressurization to an atmospheric pressure state, and keeping the atmospheric pressure state for 1~10 minutes.

(6) Taking the capacitor core out, placing the capacitor core in a high temperature of 50~100° C. and drying it for 20~60 minutes (preferably but not limited to 85° C.), then placing the capacitor core in a temperature of 110~200° C. and drying it for 20~60 minutes (preferably but not limited to 150° C.), and taking the capacitor core out.

(7) Repeating steps (3) to (6) at least once, preferably but not limited to five times.

(8) Putting the capacitor core in an aluminum cover, sealing the capacitor core with a rubber plug, and performing aging treatment to obtain a solid electrolyte aluminum-electrolytic capacitor.

The present invention further provides a method for manufacturing a solid electrolyte aluminum-electrolytic capacitor, in which a solid electrolyte is a conductive polymer and a conductive carbon material. The manufacturing method specifically includes the following steps:

(1) Winding electrolytic paper between an anodized aluminum foil and a cathode foil into a capacitor core, welding an anode of the capacitor core onto an iron bar, and impregnating the capacitor core in a forming agent. According to a voltage of a positive foil, applying a specific voltage for at least 20 minutes. After the chemical treatment, impregnating the capacitor core in 40~100° C. pure water for 30~60 minutes, removing residual ingredients in the forming agent, then drying the capacitor core in a low temperature of 50~100° C. for 20~100 minutes, and then drying it in a high temperature of 110~200° C. for 20~60 minutes.

(2) Impregnating the dried capacitor core in a dispersion A for 1~30 minutes.

(3) Removing the capacitor core out of the dispersion A, creating a vacuum and then impregnating the capacitor core in the dispersion A for 1~10 minutes.

(4) Keeping the capacitor core in the dispersion A, breaking the vacuum and then performing pressurization, and keeping the pressurized state for 1~10 minutes.

(5) Keeping the capacitor core in the dispersion A, performing depressurization to an atmospheric pressure, and keeping the atmospheric pressure for 1~10 minutes.

(6) Taking the capacitor core out, placing the capacitor core in a temperature of 65~100° C. and drying it for 20~60 minutes, and then placing the capacitor core in a temperature of 135~165° C. and drying it for 20~60 minutes.

(7) Impregnating the dried capacitor core in a dispersion C for 1~30 minutes.

(8) Taking the capacitor core out, placing the capacitor core in a temperature of 65~100° C. and drying it for 20~60 minutes, and then placing the capacitor core in a temperature of 135~165° C. and drying it for 20~60 minutes.

(9) Repeating steps (3) to (8) at least once.

(10) Putting the capacitor core in an aluminum cover and sealing it, and performing aging treatment to obtain a solid electrolyte aluminum-electrolytic capacitor.

The present invention still further provides a method for manufacturing a solid electrolyte aluminum-electrolytic capacitor, in which a solid electrolyte is a conductive polymer and a conductive carbon material. The manufacturing method specifically includes the following steps:

(1) Winding electrolytic paper between an anodized aluminum foil and a cathode foil into a capacitor core, welding an anode of the capacitor core onto an iron bar, and impregnating the capacitor core in a forming agent. According to a voltage of a positive foil, applying a specific voltage for at least 20 minutes. After the chemical treatment, impregnating the capacitor core in 40~100° C. pure water for 30~60 minutes, removing residual ingredients in the forming agent, then drying the capacitor core in a low temperature of 50~100° C. for 20~100 minutes, and then drying it in a high temperature of 110~200° C. for 20~60 minutes.

(2) Impregnating the dried capacitor core in a dispersion B for 1~30 minutes.

(3) Removing the capacitor core out of the dispersion B, creating a vacuum and then impregnating the capacitor core in the dispersion B for 1~10 minutes.

(4) Keeping the capacitor core in the dispersion B, breaking the vacuum and then performing pressurization, and keeping the pressurized state for 1~10 minutes.

(5) Keeping the capacitor core in the dispersion B, performing depressurization to an atmospheric pressure, and keeping the atmospheric pressure for 1~10 minutes.

(6) Taking the capacitor core out, placing the capacitor core in a temperature of 65~100° C. and drying it for 20~60 minutes, and then placing the capacitor core in a temperature of 135~165° C. and drying it for 20~60 minutes.

(7) Impregnating the dried capacitor core in a dispersion C for 1~30 minutes.

(8) Taking the capacitor core out, placing the capacitor core in a temperature of 65~100° C. and drying it for 20~60 minutes, and then placing the capacitor core in a temperature of 135~165° C. and drying it for 20~60 minutes.

(9) Repeating steps (3) to (8) at least once.

(10) Putting the capacitor core in an aluminum cover and sealing it, and performing aging treatment to obtain a solid electrolyte aluminum-electrolytic capacitor.

The vacuum state and the pressurized state mentioned in the present invention may be implemented on one device or on two different devices, but preferably, on one device. The capacitor core and the dispersion are simultaneously in the vacuum state or atmospheric pressure state or pressurized state.

The manufacturing method is applicable not only to a high-voltage solid electrolyte aluminum-electrolytic capacitor but also to a solid electrolyte capacitor of tantalum, niobium, titanium, or the like.

The following gives detailed description with reference to specific embodiments.

Embodiment 1

A conductive polymer of a dispersion A used in this embodiment is poly (3,4-ethylene dioxythiophene) with a particle size of about 40 to 80 nm, preferably 60 nm. Specifications of capacitors are 200V100 µF, and the size of the capacitors is Φ16*26 mm. A method for manufacturing the capacitors is as follows:

(1) Using a JCC anodized foil (manufactured by Japan Capacitor Industrial Co., Ltd), whose model is HGF110J16-365VF-1.33 µF, where the JCC anodized foil is 17 mm in width and 491 mm in length; using a Nanofoil cathode foil whose model is NF3000, where the Nanofoil cathode foil is 17 mm in width and 521 mm in length; and electrolytic paper is Asahi Kasei ADS040060 that is 20 mm in width. Winding the electrolytic paper between the anodized foil and the cathode foil into a capacitor core, welding an anode of the capacitor core onto an iron bar, and impregnating the capacitor core in a forming agent. According to a voltage of a positive foil, applying a 365V voltage in a phosphoric acid forming agent for 20 minutes. After the chemical treatment, impregnating the capacitor core in 70° C. pure water for 30 minutes to remove residual ingredients in the forming agent, then drying the capacitor core in a low temperature of 75° C. for 60 minutes, and then drying it in a high temperature of 150° C. for 30 minutes.

(2) Impregnating the dried capacitor core in a dispersion A for 15 minutes.

(3) Removing the capacitor core out of the dispersion A, creating a vacuum to reach an 850 Pa vacuum state and then impregnating the capacitor core in the dispersion A for 5 minutes.

(4) Taking the capacitor core out, placing the capacitor core in a low temperature of 85° C. and drying it for 60 minutes, then placing the capacitor core in a high temperature of 150° C. and drying it for 30 minutes, and taking the capacitor core out.

(5) Repeating steps (3) to (4) five times.

(6) Putting the capacitor core in an aluminum cover, sealing the capacitor core with a rubber plug, and performing aging treatment to obtain a solid electrolyte aluminum-electrolytic capacitor. An aging method is: Placing the product in a 110° C. environment, applying a 0.2× rated voltage for 80 minutes, then applying a 0.5× rated voltage for 60 minutes, then applying a 0.8× rated voltage for 40 minutes, then applying a 1.0× rated voltage for 20 minutes, and then applying a 1.2× rated voltage for 20 minutes.

After completion of the aging, 20 samples are taken for testing, the result of which is shown in Table 1.

TABLE 1

Performance test for capacitors manufactured in Embodiment 1

| Serial No. | CAP(uF) | DF(%) | ESR(mΩ)/100 kHz | LC(uA)/1 min |
|---|---|---|---|---|
| 1 | 94.04 | 4.03 | 16.70 | 14.40 |
| 2 | 93.35 | 3.20 | 16.50 | 12.80 |
| 3 | 93.28 | 3.16 | 18.20 | 24.10 |
| 4 | 92.42 | 3.94 | 17.30 | 12.00 |
| 5 | 92.40 | 4.02 | 18.00 | 8.90 |
| 6 | 91.82 | 4.56 | 16.90 | 7.00 |
| 7 | 92.72 | 3.73 | 16.50 | 7.00 |
| 8 | 94.32 | 3.57 | 16.80 | 33.30 |
| 9 | 92.95 | 3.71 | 16.70 | 5.30 |
| 10 | 91.99 | 3.44 | 17.20 | 8.10 |
| 11 | 92.03 | 3.56 | 17.10 | 14.00 |
| 12 | 91.97 | 5.17 | 18.10 | 12.20 |
| 13 | 92.86 | 3.69 | 17.00 | 29.40 |
| 14 | 92.77 | 3.94 | 17.80 | 9.60 |
| 15 | 91.49 | 5.22 | 18.80 | 8.00 |
| 16 | 93.54 | 3.38 | 17.70 | 8.90 |
| 17 | 93.73 | 3.82 | 18.60 | 7.00 |
| 18 | 93.40 | 3.41 | 17.40 | 13.00 |
| 19 | 93.27 | 3.23 | 16.90 | 6.70 |
| 20 | 95.17 | 3.42 | 17.60 | 5.00 |
| MIN | 91.49 | 3.16 | 16.50 | 5.00 |
| MAX | 95.17 | 5.22 | 18.80 | 33.30 |
| AVE | 92.98 | 3.81 | 17.39 | 12.34 |

Embodiment 2

Similar to Embodiment 1, this embodiment intends to manufacture 20 capacitors and analyze them, in which specifications of the capacitors are 200V100 μF and the size of the capacitors is Φ16*26 mm. A difference between the manufacturing method in Embodiment 1 and this embodiment is: Step (3): Keeping the capacitor core in the dispersion A, feeding compressed air until 0.5 MPa, and keeping the pressurized state for 5 minutes. Other steps and the implementation order remain the same. An analysis result is shown in Table 2.

TABLE 2

Performance test for capacitors manufactured in Embodiment 2

| Serial No. | CAP(uF) | DF(%) | ESR(mΩ)/100 kHz | LC(uA)/1 min |
|---|---|---|---|---|
| 1 | 93.82 | 3.51 | 17.30 | 18.00 |
| 2 | 93.99 | 3.85 | 18.40 | 15.00 |
| 3 | 94.23 | 3.45 | 15.60 | 33.00 |
| 4 | 93.84 | 3.77 | 16.50 | 15.00 |
| 5 | 94.98 | 3.85 | 17.10 | 13.00 |
| 6 | 93.68 | 3.11 | 17.60 | 10.00 |
| 7 | 94.31 | 3.50 | 16.50 | 10.00 |
| 8 | 91.48 | 4.93 | 17.40 | 7.00 |
| 9 | 92.90 | 4.28 | 15.80 | 8.00 |
| 10 | 92.51 | 3.41 | 16.30 | 6.00 |
| 11 | 94.91 | 3.20 | 16.50 | 20.00 |
| 12 | 93.43 | 3.58 | 17.40 | 7.00 |
| 13 | 92.65 | 3.05 | 16.20 | 14.00 |
| 14 | 91.21 | 3.40 | 16.40 | 12.00 |
| 15 | 93.98 | 3.71 | 16.90 | 4.00 |
| 16 | 94.36 | 3.29 | 16.80 | 9.00 |
| 17 | 93.96 | 4.01 | 16.90 | 8.00 |
| 18 | 92.82 | 3.09 | 18.50 | 8.00 |
| 19 | 93.13 | 3.07 | 17.50 | 7.00 |
| 20 | 92.47 | 3.16 | 17.80 | 11.00 |
| MIN | 91.21 | 3.05 | 15.60 | 4.00 |
| MAX | 94.98 | 4.93 | 18.50 | 33.00 |
| AVE | 93.43 | 3.56 | 16.97 | 11.75 |

Embodiment 3

Similar to Embodiment 1, this embodiment intends to manufacture 20 capacitors and analyze them, in which specifications of the capacitors are 200V100 μF and the size of the capacitors is Φ16*26 mm. A difference between the manufacturing method in Embodiment 1 and this embodiment is that an atmospheric pressure impregnation step is added between step (3) and step (4). The atmospheric pressure impregnation step is specifically: Keeping the capacitor core in the dispersion A, breaking the vacuum until an atmospheric pressure state, and keeping the pressurized state for 5 minutes. Other steps remain unchanged. An analysis result is shown in Table 3.

TABLE 3

Performance test for capacitors manufactured in Embodiment 3

| Serial No. | CAP(uF) | DF(%) | ESR(mΩ)/100 kHz | LC(uA)/1 min |
|---|---|---|---|---|
| 1 | 96.16 | 2.87 | 14.50 | 56.00 |
| 2 | 97.58 | 3.22 | 14.30 | 31.70 |
| 3 | 94.38 | 2.97 | 13.80 | 17.30 |
| 4 | 96.03 | 2.90 | 14.30 | 15.00 |
| 5 | 94.05 | 2.87 | 15.20 | 13.30 |
| 6 | 97.31 | 3.37 | 13.20 | 12.80 |
| 7 | 97.49 | 2.87 | 14.70 | 11.10 |
| 8 | 97.45 | 2.90 | 13.30 | 9.00 |
| 9 | 97.59 | 2.81 | 15.80 | 9.80 |
| 10 | 95.68 | 2.92 | 13.60 | 9.00 |
| 11 | 96.89 | 2.83 | 14.10 | 32.00 |
| 12 | 97.52 | 2.93 | 13.60 | 20.20 |
| 13 | 97.60 | 3.23 | 13.20 | 30.00 |
| 14 | 96.80 | 2.77 | 14.40 | 15.60 |
| 15 | 95.52 | 3.06 | 13.80 | 12.00 |
| 16 | 96.96 | 3.11 | 13.70 | 13.30 |
| 17 | 97.55 | 2.98 | 13.90 | 14.00 |
| 18 | 95.94 | 2.94 | 14.24 | 9.20 |
| 19 | 97.48 | 3.97 | 15.66 | 9.00 |
| 20 | 98.08 | 2.97 | 13.05 | 8.30 |
| MIN | 94.05 | 2.77 | 13.05 | 8.30 |
| MAX | 98.08 | 3.97 | 15.80 | 56.00 |
| AVE | 96.70 | 3.02 | 14.12 | 17.43 |

Embodiment 4

Similar to Embodiment 2, this embodiment intends to manufacture 20 capacitors and analyze them, in which specifications of the capacitors are 200V100 μF and the size of the capacitors is Φ16*26 mm. A difference between the manufacturing method in Embodiment 2 and this embodiment is that an atmospheric pressure impregnation step is added between step (3) and step (4). The atmospheric pressure impregnation step is specifically: Keeping the capacitor core in the dispersion A, performing pressurization to an atmospheric pressure state, and keeping the pressurized state for 5 minutes. Other steps remain unchanged. An analysis result is shown in Table 4.

TABLE 4

Performance test for capacitors manufactured in Embodiment 4

| Serial No. | CAP(uF) | DF(%) | ESR(mΩ)/100 kHz | LC(uA)/1 min |
|---|---|---|---|---|
| 1 | 99.88 | 2.30 | 13.70 | 23.00 |
| 2 | 99.22 | 2.43 | 14.20 | 25.30 |
| 3 | 99.80 | 2.47 | 12.40 | 23.20 |
| 4 | 99.08 | 2.68 | 12.60 | 15.60 |
| 5 | 98.86 | 2.42 | 14.50 | 13.00 |
| 6 | 98.52 | 2.97 | 12.80 | 20.00 |
| 7 | 98.59 | 2.82 | 13.70 | 25.60 |
| 8 | 99.18 | 2.62 | 13.40 | 17.40 |
| 9 | 99.13 | 2.69 | 12.60 | 25.00 |
| 10 | 98.95 | 2.23 | 13.80 | 16.90 |
| 11 | 99.17 | 2.85 | 13.20 | 20.00 |
| 12 | 98.64 | 2.74 | 13.50 | 17.60 |
| 13 | 98.46 | 2.59 | 13.30 | 14.30 |
| 14 | 99.30 | 2.97 | 13.40 | 12.00 |
| 15 | 99.66 | 2.99 | 12.90 | 11.00 |
| 16 | 99.14 | 2.69 | 12.50 | 19.90 |
| 17 | 98.51 | 2.73 | 12.90 | 18.00 |
| 18 | 98.73 | 2.66 | 13.10 | 18.70 |
| 19 | 98.44 | 3.01 | 12.70 | 17.00 |
| 20 | 97.94 | 2.19 | 14.10 | 11.00 |
| MIN | 97.94 | 2.19 | 12.40 | 11.00 |
| MAX | 99.88 | 3.01 | 14.50 | 25.60 |
| AVE | 98.96 | 2.65 | 13.27 | 18.23 |

Embodiment 5

A method for manufacturing capacitors is as follows:

(1) Using a JCC anodized foil whose model is HGF110J16-365VF-1.33 μF, where the JCC anodized foil is 17 mm in width and 491 mm in length; using a Nanofoil cathode foil whose model is NF3000, where the Nanofoil cathode foil is 17 mm in width and 521 mm in length; and electrolytic paper is Asahi Kasel ADS040060 that is 20 mm in width. Specifications of manufactured capacitors are 200V100 μF and the size of the capacitors is Φ16*26 mm. Winding the electrolytic paper between the anodized foil and the cathode foil into a capacitor core, welding an anode of the capacitor core onto an iron bar, and impregnating the capacitor core in a forming agent. According to a voltage of a positive foil, applying a 365V voltage in a phosphoric acid forming agent for 20 minutes. After the chemical treatment, impregnating the capacitor core in 70° C. pure water for 30 minutes to remove residual ingredients in the forming agent, then drying the capacitor core in a low temperature of 75° C. for 60 minutes, and then drying it in a high temperature of 150° C. for 30 minutes.

(2) Impregnating the dried capacitor core in a dispersion A for 15 minutes.

(3) Removing the capacitor core out of the dispersion A, creating a vacuum to reach an 850 Pa vacuum state and then impregnating the capacitor core in the dispersion A for 5 minutes.

(4) Keeping the capacitor core in the dispersion A, breaking the vacuum and then feeding compressed air until 0.5 MPa, and keeping the pressurized state for 5 minutes.

(5) Keeping the capacitor core in the dispersion A, performing depressurization to an atmospheric pressure state, and keeping the atmospheric pressure state for 5 minutes.

(6) Taking the capacitor core out, placing the capacitor core in a low temperature of 85° C. and drying it for 60 minutes, then placing the capacitor core in a high temperature of 150° C. and drying it for 30 minutes, and taking the capacitor core out.

(7) Repeating steps (3) to (6) five times.

(8) Putting the capacitor core in an aluminum cover, sealing the capacitor core with a rubber plug, and performing aging treatment to obtain a solid electrolyte aluminum-electrolytic capacitor. An aging method is: Placing the product in a 110° C. environment, applying a 0.2× rated voltage for 80 minutes, then applying a 0.5× rated voltage for 60 minutes, then applying a 0.8× rated voltage for 40 minutes, then applying a 1.0× rated voltage for 20 minutes, and then applying a 1.2× rated voltage for 20 minutes.

After completion of the aging, 20 samples are taken for testing, the result of which is shown in Table 5.

TABLE 5

Performance test for capacitors manufactured in Embodiment 5

| Serial No. | CAP(uF) | DF(%) | ESR(mΩ)/100 kHz | LC(uA)/1 min |
|---|---|---|---|---|
| 1 | 101.04 | 2.27 | 12.90 | 20.00 |
| 2 | 100.38 | 2.40 | 12.90 | 20.70 |
| 3 | 100.69 | 2.46 | 12.50 | 23.20 |
| 4 | 101.29 | 2.36 | 12.60 | 24.60 |
| 5 | 101.21 | 2.60 | 12.70 | 22.00 |
| 6 | 99.05 | 2.37 | 12.80 | 17.40 |
| 7 | 101.21 | 2.51 | 12.70 | 16.00 |
| 8 | 101.37 | 2.38 | 13.40 | 18.10 |
| 9 | 101.57 | 2.36 | 12.60 | 19.90 |
| 10 | 100.80 | 2.41 | 13.20 | 18.10 |
| 11 | 101.82 | 2.24 | 13.10 | 22.20 |
| 12 | 102.04 | 2.46 | 12.90 | 18.00 |
| 13 | 99.27 | 2.55 | 13.10 | 18.00 |
| 14 | 101.79 | 2.17 | 13.40 | 21.00 |
| 15 | 100.72 | 2.43 | 12.70 | 18.90 |
| 16 | 99.71 | 2.31 | 12.70 | 16.80 |
| 17 | 100.94 | 2.58 | 13.10 | 23.30 |
| 18 | 100.78 | 2.43 | 12.40 | 16.00 |
| 19 | 95.82 | 2.49 | 12.40 | 18.60 |
| 20 | 100.70 | 2.66 | 12.60 | 20.60 |
| MIN | 95.82 | 2.17 | 12.40 | 16.00 |
| MAX | 102.04 | 2.66 | 13.40 | 24.60 |
| AVE | 100.61 | 2.42 | 12.84 | 19.67 |

Embodiment 6

A method for manufacturing capacitors is as follows:

(1) Using a JCC anodized foil whose model is 110LJB22B-33VF-58.4 μF, where the JCC anodized foil is 17 mm in width and 391 mm in length; using a Nanofoil cathode foil whose model is NF3000, where the Nanofoil cathode foil is 17 mm in width and 421 mm in length; and electrolytic paper is NKK,RTZ3040 that is 20 mm in width. Specifications of manufactured capacitors are 16V3300 μF and the size of the capacitors is Φ16*26 mm. Winding the electrolytic paper between the anodized foil and the cathode foil into a capacitor core, welding an anode of the capacitor core onto an iron bar, and impregnating the capacitor core in a forming agent. According to a voltage of a positive foil, applying a 365V voltage in a phosphoric acid forming agent for 20 minutes. After the chemical treatment, impregnating the capacitor core in 70° C. pure water for 30 minutes to remove residual ingredients in the forming agent, then drying the capacitor core in a low-temperature of 75° C. drying for 60 minutes, and then drying it in a high temperature of 150° C. for 30 minutes.

(2) Impregnating the dried capacitor core in a dispersion A for 15 minutes.

(3) Removing the capacitor core out of the dispersion A, creating a vacuum to reach an 850 Pa vacuum state and then impregnating the capacitor core in the dispersion A for 5 minutes; and taking the capacitor core out, placing it in a low temperature of 85° C. and drying it for 60 minutes.

(4) Impregnating the capacitor core in the dispersion A, breaking the vacuum and then feeding compressed air until 0.5 MPa, and keeping it impregnated for 5 minutes; and taking the capacitor core out, placing it in a low temperature of 85° C. and drying it for 60 minutes.

(5) Impregnating the capacitor core in the dispersion A, performing pressurization to an atmospheric pressure, and keeping the pressurized state for 5 minutes; taking the capacitor core out, placing the capacitor core in a low temperature of 85° C. and drying it for 60 minutes, then placing the capacitor core in a high temperature of 150° C. and drying it for 30 minutes, and taking the capacitor core out.

(6) Repeating steps (3) to (5) five times.

(7) Putting the capacitor core in an aluminum cover, sealing the capacitor core with a rubber plug, and performing aging treatment to obtain a solid electrolyte aluminum-electrolytic capacitor. An aging method is: Placing the product in a 110° C. environment, applying a 0.2× rated voltage for 80 minutes, then applying a 0.5× rated voltage for 60 minutes, then applying a 0.8× rated voltage for 40 minutes, then applying a 1.0× rated voltage for 20 minutes, and then applying a 1.2× rated voltage for 20 minutes.

After completion of the aging, 20 samples are taken for testing, the result of which is shown in Table 6.

TABLE 6

Performance test for capacitors manufactured in Embodiment 6

| Serial No. | CAP(uF) | DF(%) | ESR(mΩ)/100 kHz | LC(uA)/1 min |
|---|---|---|---|---|
| 1 | 3305.1 | 2.10 | 11.40 | 25.30 |
| 2 | 3307.2 | 2.13 | 11.70 | 26.00 |
| 3 | 3300.8 | 2.12 | 11.60 | 26.50 |
| 4 | 3305.1 | 2.21 | 12.0 | 29.10 |
| 5 | 3309.2 | 2.22 | 12.20 | 31.30 |
| 6 | 3301.1 | 2.12 | 11.90 | 22.00 |
| 7 | 3305.2 | 2.22 | 12.10 | 23.30 |
| 8 | 3301.2 | 2.23 | 12.10 | 25.00 |
| 9 | 3304.1 | 2.22 | 12..10 | 25.00 |
| 10 | 3305.2 | 2.21 | 11.70 | 22.00 |
| 11 | 3302.1 | 2.23 | 11.80 | 37.00 |
| 12 | 3308.2 | 2.12 | 11.60 | 25.00 |
| 13 | 3310.3 | 2.18 | 11.40 | 28.00 |
| 14 | 3300.9 | 2.09 | 11.60 | 28.20 |
| 15 | 3302.4 | 2.22 | 11.40 | 21.70 |
| 16 | 3302.5 | 2.12 | 11.40 | 24.00 |
| 17 | 3308.2 | 2.33 | 11.60 | 25.10 |
| 18 | 3309.1 | 2.23 | 11.80 | 23.00 |
| 19 | 3310.2 | 2.13 | 11.70 | 29.30 |
| 20 | 3309.7 | 2.19 | 11.90 | 38.60 |
| MIN | 3300.8 | 2.09 | 11.40 | 21.70 |
| MAX | 3310.3 | 2.33 | 12.20 | 38.60 |
| AVE | 3305.1 | 2.18 | 11.70 | 26.77 |

Embodiment 7

Similar to Embodiment 5, this embodiment intends to manufacture 20 capacitors and analyze them. A difference between the manufacturing method in Embodiment 5 and this embodiment is that a JCC anodized foil (model: HGF110J16-365VF-1.33 µF; width: 7.5 mm; length: 192 mm) and a Nanofoil cathode foil (model: NF3000; width: 7.5 mm; length: 212 mm) are used, and electrolytic paper whose width is 15 mm and whose model is Asahi Kasel ADS040060 is wound between the anodized foil and the cathode foil into a capacitor core, so that capacitors are made, whose specifications are 200V15 uF and whose size is Φ10*12 mm. An analysis result of the capacitors is shown in Table 7.

TABLE 7

Performance test for capacitors manufactured in Embodiment 7

| Serial No. | CAP(uF) | DF(%) | ESR(mΩ)/100 kHz | LC(uA)/1 min |
|---|---|---|---|---|
| 1 | 15.73 | 2.74 | 31.60 | 1.50 |
| 2 | 15.22 | 2.90 | 25.90 | 1.50 |
| 3 | 15.84 | 2.49 | 30.00 | 1.40 |
| 4 | 15.73 | 2.66 | 25.10 | 1.30 |
| 5 | 15.49 | 2.88 | 26.10 | 1.20 |
| 6 | 15.51 | 2.74 | 27.10 | 1.20 |
| 7 | 15.62 | 2.58 | 26.30 | 1.20 |
| 8 | 15.50 | 2.48 | 25.90 | 1.20 |
| 9 | 15.57 | 2.49 | 26.50 | 1.20 |
| 10 | 15.60 | 2.71 | 29.70 | 1.20 |
| 11 | 15.54 | 2.79 | 22.00 | 1.30 |
| 12 | 14.98 | 2.30 | 28.30 | 1.00 |
| 13 | 15.57 | 2.96 | 31.20 | 1.20 |
| 14 | 15.53 | 2.82 | 27.30 | 1.10 |
| 15 | 15.33 | 2.96 | 26.40 | 1.20 |
| 16 | 15.33 | 2.97 | 25.60 | 1.20 |
| 17 | 15.48 | 2.63 | 23.70 | 1.40 |
| 18 | 15.39 | 2.49 | 23.60 | 1.10 |
| 19 | 15.36 | 2.70 | 23.40 | 1.30 |
| 20 | 15.42 | 2.78 | 24.30 | 1.30 |
| MIN | 14.98 | 2.30 | 22.00 | 1.00 |
| MAX | 15.84 | 2.97 | 31.60 | 1.50 |
| AVE | 15.49 | 2.70 | 26.50 | 1.25 |

Embodiment 8

Similar to Embodiment 5, this embodiment intends to manufacture 20 capacitors and analyze them. A difference between the manufacturing method in Embodiment 5 and this embodiment is that a JCC anodized foil (model: HGF110J16-365VF-1.33 µF; width: 13 mm; length: 302 mm) and a Nanofoil cathode foil (model: NF3000; width: 13 mm; length: 327 mm) are used, and electrolytic paper whose width is 15 mm and whose model is Asahi Kasel ADS040060 is wound between the anodized foil and the cathode foil into a capacitor core, so that capacitors are made, whose specifications are 200V47 uF and whose size is Φ13*20 mm. An analysis result of the capacitors is shown in Table 8.

TABLE 8

Performance test for capacitors manufactured in Embodiment 8

| Serial No. | CAP(uF) | DF(%) | ESR(mΩ)/100 kHz | LC(uA)/1 min |
|---|---|---|---|---|
| 1 | 46.74 | 3.30 | 17.90 | 13.20 |
| 2 | 47.07 | 3.38 | 18.10 | 7.40 |
| 3 | 46.99 | 3.22 | 17.80 | 6.90 |
| 4 | 47.11 | 2.91 | 16.90 | 9.10 |
| 5 | 47.21 | 3.01 | 16.60 | 13.90 |
| 6 | 46.52 | 2.74 | 17.20 | 8.80 |
| 7 | 47.66 | 2.88 | 18.30 | 6.50 |
| 8 | 45.65 | 2.59 | 17.60 | 6.70 |
| 9 | 47.66 | 2.80 | 16.70 | 13.80 |

TABLE 8-continued

Performance test for capacitors manufactured in Embodiment 8

| Serial No. | CAP(uF) | DF(%) | ESR(mΩ)/100 kHz | LC(uA)/1 min |
|---|---|---|---|---|
| 10 | 46.63 | 3.00 | 17.50 | 7.90 |
| 11 | 46.98 | 3.40 | 17.50 | 11.70 |
| 12 | 45.78 | 3.40 | 17.80 | 7.80 |
| 13 | 46.80 | 3.00 | 17.30 | 11.10 |
| 14 | 46.90 | 3.00 | 17.00 | 6.20 |
| 15 | 46.29 | 3.20 | 18.30 | 7.50 |
| 16 | 45.74 | 2.60 | 17.60 | 8.70 |
| 17 | 46.05 | 2.80 | 16.60 | 18.20 |
| 18 | 46.16 | 2.60 | 18.00 | 5.90 |
| 19 | 46.28 | 2.60 | 17.40 | 7.40 |
| 20 | 47.00 | 2.97 | 18.10 | 18.00 |
| MIN | 45.65 | 2.59 | 16.60 | 5.90 |
| MAX | 47.66 | 3.40 | 18.30 | 18.20 |
| AVE | 46.66 | 2.97 | 17.51 | 9.84 |

Embodiment 9

Similar to Embodiment 5, this embodiment intends to manufacture 20 capacitors and analyze them. Specifications of the manufactured capacitors are 200V100 μF and the size of the capacitors is Φ16*26 mm. A difference between the manufacturing method in Embodiment 5 and this embodiment is that a particle size of a conductive polymer used in this embodiment is 30~50 nm. An analysis result of the capacitors is shown in Table 9.

TABLE 9

Performance test for capacitors manufactured in Embodiment 9

| Serial No. | CAP(uF) | DF(%) | ESR(mΩ)/100 kHz | LC(uA)/1 min |
|---|---|---|---|---|
| 1 | 102.13 | 1.78 | 19.70 | 19.00 |
| 2 | 103.50 | 1.83 | 21.10 | 16.00 |
| 3 | 102.25 | 1.73 | 19.90 | 16.50 |
| 4 | 103.57 | 1.72 | 20.30 | 16.10 |
| 5 | 103.00 | 1.64 | 18.70 | 16.00 |
| 6 | 102.90 | 1.80 | 20.10 | 16.70 |
| 7 | 103.81 | 1.63 | 18.65 | 16.00 |
| 8 | 102.25 | 1.83 | 20.60 | 18.40 |
| 9 | 102.55 | 1.70 | 20.60 | 14.00 |
| 10 | 101.49 | 1.64 | 18.30 | 14.00 |
| 11 | 101.76 | 2.01 | 19.30 | 19.00 |
| 12 | 102.98 | 2.03 | 19.42 | 14.00 |
| 13 | 102.65 | 1.91 | 19.70 | 11.00 |
| 14 | 101.31 | 1.89 | 18.71 | 12.00 |
| 15 | 103.44 | 1.82 | 20.80 | 16.20 |
| 16 | 103.27 | 1.96 | 21.60 | 17.00 |
| 17 | 103.26 | 1.86 | 17.50 | 17.00 |
| 18 | 102.70 | 1.92 | 20.10 | 11.60 |
| 19 | 103.01 | 1.86 | 20.40 | 18.00 |
| 20 | 102.98 | 1.77 | 19.50 | 13.70 |
| MIN | 101.31 | 1.63 | 17.50 | 11.00 |
| MAX | 103.81 | 2.03 | 21.60 | 19.00 |
| AVE | 102.74 | 1.82 | 19.75 | 15.61 |

Embodiment 10

Similar to Embodiment 5, this embodiment intends to manufacture 20 capacitors and analyze them. Specifications of the manufactured capacitors are 200V100 μF and the size of the capacitors is Φ16*26 mm. A difference between the manufacturing method in Embodiment 5 and this embodiment is that a particle size of a conductive polymer used in this embodiment is 70~90 nm. An analysis result of the capacitors is shown in Table 10.

TABLE 10

Performance test for capacitors manufactured in Embodiment 10

| Serial No. | CAP(uF) | DF(%) | ESR(mΩ)/100 kHz | LC(uA)/1 min |
|---|---|---|---|---|
| 1 | 102.21 | 1.62 | 20.00 | 5.80 |
| 2 | 101.82 | 1.91 | 19.80 | 4.80 |
| 3 | 101.68 | 1.78 | 20.70 | 4.20 |
| 4 | 102.10 | 1.80 | 18.90 | 6.20 |
| 5 | 102.94 | 1.93 | 18.10 | 5.50 |
| 6 | 102.64 | 1.74 | 19.60 | 5.80 |
| 7 | 102.75 | 2.03 | 21.60 | 4.80 |
| 8 | 101.52 | 1.77 | 18.90 | 6.20 |
| 9 | 102.57 | 1.87 | 18.20 | 6.00 |
| 10 | 102.91 | 2.18 | 17.20 | 6.00 |
| 11 | 100.16 | 1.75 | 19.70 | 4.60 |
| 12 | 101.70 | 1.89 | 18.90 | 4.20 |
| 13 | 101.91 | 2.01 | 19.40 | 6.90 |
| 14 | 101.77 | 2.11 | 18.90 | 5.90 |
| 15 | 101.39 | 1.74 | 18.80 | 4.70 |
| 16 | 100.44 | 1.86 | 19.60 | 4.50 |
| 17 | 100.25 | 1.85 | 20.50 | 5.90 |
| 18 | 102.52 | 2.22 | 18.60 | 4.20 |
| 19 | 103.01 | 1.85 | 19.00 | 7.30 |
| 20 | 102.58 | 2.21 | 21.50 | 4.60 |
| MIN | 100.16 | 1.62 | 17.20 | 4.20 |
| MAX | 103.01 | 2.22 | 21.60 | 7.30 |
| AVE | 101.94 | 1.91 | 19.40 | 5.41 |

Embodiment 11

A solid electrolyte used in this embodiment is a mixture of a conductive polymer and a conductive carbon material. The conductive polymer is poly (3,4-ethylene dioxythiophene) whose particle size is about 40~80 nm, preferably 60 nm. The conductive carbon material is graphene whose average particle size is 150 nm. A dispersion B is prepared by mixing the poly (3,4-ethylene dioxythiophene) and the graphene at a weight percentage of 1:1, in which concentrations of the graphene and the poly (3,4-ethylene dioxythiophene) are weight percentages 3% and 3% respectively. A method for manufacturing capacitors is as follows:

(1) Using a JCC anodized foil whose model is HGF110J16-365VF-1.33 μF, where the JCC anodized foil is 17 mm in width and 491 mm in length; using a Nanofoil cathode foil whose model is NF3000, where the Nanofoil cathode foil is 17 mm in width and 521 mm in length; and electrolytic paper is Asahi Kasel ADS040060 that is 20 mm in width. Specifications of manufactured capacitors are 200V100 μF and the size of the capacitors is Φ16*26 mm. Winding the electrolytic paper between the anodized foil and the cathode foil into a capacitor core, welding an anode of the capacitor core onto an iron bar, and impregnating the capacitor core in a forming agent. According to a voltage of a positive foil, applying a 365V voltage in a phosphoric acid forming agent for 20 minutes. After the chemical treatment, impregnating the capacitor core in 40° C. pure water for 30 minutes to remove residual ingredients in the forming agent, then drying the capacitor core in a low-temperature of 50° C. drying for 20 minutes, and then drying it in a high temperature of 160° C. for 20 minutes.

(2) Impregnating the dried capacitor core in a dispersion B for 1 minute.

(3) Removing the capacitor core out of the dispersion B, creating a vacuum to reach a 700 Pa vacuum state and then impregnating the capacitor core in the dispersion B for 5 minutes.

(4) Keeping the capacitor core in the dispersion B, breaking the vacuum and then feeding compressed air until 0.4 MPa, and keeping the pressurized state for 5 minutes.

(5) Keeping the capacitor core in the dispersion B, performing depressurization to an atmospheric pressure state, and keeping the atmospheric pressure state for 5 minutes.

(6) Taking the capacitor core out, placing the capacitor core in a low temperature of 65° C. and drying it for 60 minutes, then placing the capacitor core in a high temperature of 150° C. and drying it for 40 minutes, and taking the capacitor core out.

(7) Repeating steps (3) to (6) eight times.

(8) Putting the capacitor core in an aluminum cover, sealing the capacitor core with a rubber plug, and performing aging treatment to obtain a solid electrolyte aluminum-electrolytic capacitor.

After completion of the aging, 20 samples are taken for testing, the result of which is shown in Table 11.

TABLE 11

Performance test for capacitors manufactured in Embodiment 1

| Serial No. | CAP(uF) | DF(%) | ESR(mΩ)/100 kHz | LC(uA)/1 min |
|---|---|---|---|---|
| 1 | 101.02 | 2.20 | 10.90 | 25.00 |
| 2 | 100.01 | 2.35 | 10.40 | 27.40 |
| 3 | 101.64 | 2.36 | 10.40 | 26.00 |
| 4 | 101.23 | 2.33 | 10.30 | 25.50 |
| 5 | 101.23 | 2.21 | 10.20 | 22.40 |
| 6 | 100.05 | 2.47 | 10.30 | 18.90 |
| 7 | 101.27 | 2.43 | 10.50 | 16.90 |
| 8 | 101.32 | 2.41 | 10.20 | 19.80 |
| 9 | 101.21 | 2.23 | 10.10 | 20.50 |
| 10 | 100.34 | 2.22 | 10.40 | 21.20 |
| 11 | 101.81 | 2.21 | 10.20 | 18.90 |
| 12 | 101.03 | 2.36 | 10.60 | 18.20 |
| 13 | 100.08 | 2.28 | 10.90 | 17.90 |
| 14 | 101.69 | 2.27 | 11.10 | 22.80 |
| 15 | 100.23 | 2.33 | 10.80 | 19.20 |
| 16 | 100.07 | 2.23 | 10.20 | 19.80 |
| 17 | 100.32 | 2.34 | 10.50 | 15.10 |
| 18 | 100.11 | 2.32 | 10.20 | 16.10 |
| 19 | 102.01 | 2.35 | 10.30 | 16.70 |
| 20 | 100.23 | 2.34 | 10.50 | 18.30 |
| MIN | 100 | 2.2 | 10.10 | 15.10 |
| MAX | 102 | 2.47 | 11.10 | 27.40 |
| AVE | 100.8 | 2.312 | 10.45 | 20.33 |

Embodiment 12

In this embodiment, a conductive polymer is poly (3,4-ethylene dioxythiophene) whose particle size is about 40~80 nm, preferably 60 nm, and a conductive carbon material is a carbon nanotube whose average length is 150 nm; a dispersion A and a dispersion C are prepared, and concentrations of the carbon nanotube and the poly (3,4-ethylene dioxythiophene) are weight percentages 5% and 2% respectively. A method for manufacturing capacitors is as follows:

(1) Using a JCC anodized foil whose model is HGF110J16-365VF-1.33 µF, where the JCC anodized foil is 17 mm in width and 491 mm in length; using a Nanofoil cathode foil whose model is NF3000, where the Nanofoil cathode foil is 17 mm in width and 521 mm in length; and electrolytic paper is Asahi Kasel ADS040060 that is 20 mm in width. Specifications of manufactured capacitors are 200V100 µF and the size of the capacitors is Φ16*26 mm. Winding the electrolytic paper between the anodized foil and the cathode foil into a capacitor core, welding an anode of the capacitor core onto an iron bar, and impregnating the capacitor core in a forming agent. According to a voltage of a positive foil, applying a 365V voltage to perform chemical treatment in a phosphoric acid forming agent for 20 minutes. After the chemical treatment, impregnating the capacitor core in 40° C. pure water for 30 minutes to remove residual ingredients in the forming agent, then drying the capacitor core in a low-temperature of 50° C. drying for 20 minutes, and then drying it in a high temperature of 160° C. for 20 minutes.

(2) Impregnating the dried capacitor core in a dispersion A for 15 minutes.

(3) Removing the capacitor core out of the dispersion A, creating a vacuum to reach an 850 Pa vacuum state and then impregnating the capacitor core in the dispersion B for 10 minutes.

(4) Keeping the capacitor core in the dispersion A, breaking the vacuum and then feeding compressed air until 0.1 MPa, and keeping the pressurized state for 1 minute.

(5) Keeping the capacitor core in the dispersion A, performing pressurization to an atmospheric pressure, and keeping the pressurized state for 10 minutes; taking the capacitor core out, placing the capacitor core in low temperature of 85° C. and drying it for 40 minutes, then placing the capacitor core in a high temperature of 110° C. and drying it for 60 minutes, and taking the capacitor core out.

(6) Impregnating the dried capacitor core in the dispersion C, and keeping it impregnated for 5 minutes; taking the capacitor core out, placing the capacitor core in a low temperature of 85° C. and drying it for 20 minutes, then placing the capacitor core in a high temperature of 165° C. and drying it for 20 minutes, and taking the capacitor core out.

(7) Repeating steps (3) to (8) five times.

(8) Putting the capacitor core in an aluminum cover, sealing the capacitor core with a rubber plug, and performing aging treatment to obtain a solid electrolyte aluminum-electrolytic capacitor.

After completion of the aging, 20 samples are taken for testing, the result of which is shown in Table 1.

TABLE 12

Performance test for capacitors manufactured in Embodiment 12

| Serial No. | CAP(uF) | DF(%) | ESR(mΩ)/100 kHz | LC(uA)/1 min |
|---|---|---|---|---|
| 1 | 101.02 | 2.20 | 10.80 | 23.00 |
| 2 | 100.32 | 2.23 | 10.30 | 18.90 |
| 3 | 100.66 | 2.21 | 10.30 | 20.30 |
| 4 | 101.29 | 2.09 | 10.50 | 20.60 |
| 5 | 101.23 | 2.45 | 10.20 | 21.30 |
| 6 | 100.32 | 2.23 | 10.50 | 22.30 |
| 7 | 101.24 | 2.62 | 10.40 | 21.50 |
| 8 | 101.35 | 2.42 | 9.80 | 19.30 |
| 9 | 101.23 | 2.41 | 10.30 | 18.20 |
| 10 | 100.83 | 2.40 | 10.20 | 19.20 |
| 11 | 100.89 | 2.34 | 10.40 | 20.50 |
| 12 | 101.02 | 2.43 | 10.20 | 18.10 |
| 13 | 100.21 | 2.23 | 10.40 | 19.70 |
| 14 | 100.78 | 2.22 | 10.20 | 20.50 |
| 15 | 100.32 | 2.23 | 10.40 | 19.40 |
| 16 | 100.32 | 2.30 | 10.20 | 18.70 |
| 17 | 100.54 | 2.32 | 10.10 | 19.50 |
| 18 | 101.34 | 2.33 | 10.10 | 20.50 |
| 19 | 100.33 | 2.29 | 10.00 | 23.10 |
| 20 | 100.41 | 2.35 | 10.20 | 22.60 |
| MIN | 100.2 | 2.09 | 9.80 | 18.10 |
| MAX | 101.4 | 2.62 | 10.80 | 23.10 |
| AVE | 100.8 | 2.315 | 10.28 | 20.36 |

Embodiment 13

In this embodiment, a conductive polymer is poly (3,4-ethylene dioxythiophene) whose particle size is about 40~80 nm, preferably 60 nm, and a conductive carbon material is a carbon nanotube whose average size is 100 nm; a dispersion A and a dispersion C are prepared, and concentrations of the carbon nanotube and the poly (3,4-ethylene dioxythiophene) are weight percentages 0.5% and 2.5% respectively. A method for manufacturing capacitors is as follows:

(1) Using a JCC anodized foil whose model is HGF110J16-365VF-1.33 μF, where the JCC anodized foil is 17 mm in width and 491 mm in length; using a Nanofoil cathode foil whose model is NF3000, where the Nanofoil cathode foil is 17 mm in width and 521 mm in length; and electrolytic paper is Asahi Kasel ADS040060 that is 20 mm in width. Specifications of manufactured capacitors are 200V100 μF and the size of the capacitors is Φ16*26 mm. Winding the electrolytic paper between the anodized foil and the cathode foil into a capacitor core, welding an anode of the capacitor core onto an iron bar, and impregnating the capacitor core in a forming agent. According to a voltage of a positive foil, applying a 365V voltage in a phosphoric acid forming agent for 20 minutes. After the chemical treatment, impregnating the capacitor core in 40° C. pure water for 30 minutes to remove residual ingredients in the forming agent, then drying the capacitor core in a low-temperature of 50° C. drying for 20 minutes, and then drying it in a high temperature of 160° C. for 20 minutes.

(2) Impregnating the dried capacitor core in a dispersion C for 30 minutes.

(3) Taking the capacitor core out, placing the capacitor core in a low temperature of 85° C. and drying it for 60 minutes, and then placing the capacitor core in a high temperature of 150° C. and drying it for 30 minutes.

(4) Impregnating the dried capacitor core in a dispersion A for 15 minutes.

(5) Removing the capacitor core out of the dispersion A, creating a vacuum to reach a 970 Pa vacuum state and then impregnating the capacitor core in the dispersion B for 8 minutes.

(6) Keeping the capacitor core in the dispersion A, breaking the vacuum and then feeding compressed air until 0.6 MPa, and keeping the pressurized state for 10 minutes.

(7) Keeping the capacitor core in the dispersion A, performing depressurization to an atmospheric pressure state, and keeping the atmospheric pressure state for 1 minute.

(8) Taking the capacitor core out, placing the capacitor core in a low temperature of 100° C. and drying it for 20 minutes, and then placing the capacitor core in a high temperature of 135° C. and drying it for 60 minutes.

(9) Repeating steps (4) to (8) five times.

(10) Putting the capacitor core in an aluminum cover, sealing the capacitor core with a rubber plug, and performing aging treatment to obtain a solid electrolyte aluminum-electrolytic capacitor.

After completion of the aging, 20 samples are taken for testing, the result of which is shown in Table 13.

TABLE 13

Performance test for capacitors manufactured in Embodiment 13

| Serial No. | CAP(uF) | DF(%) | ESR(mΩ)/100 kHz | LC(uA)/1 min |
| --- | --- | --- | --- | --- |
| 1 | 101.05 | 2.26 | 10.30 | 21.20 |
| 2 | 100.72 | 2.26 | 10.30 | 18.90 |
| 3 | 100.31 | 2.28 | 10.10 | 18.90 |
| 4 | 101.54 | 2.29 | 10.20 | 20.60 |
| 5 | 101.45 | 2.46 | 10.80 | 21.10 |
| 6 | 100.39 | 2.32 | 10.20 | 22.10 |
| 7 | 101.48 | 2.41 | 10.30 | 21.20 |
| 8 | 101.47 | 2.45 | 10.10 | 20.10 |
| 9 | 101.44 | 2.41 | 10.10 | 19.80 |
| 10 | 100.45 | 2.48 | 10.10 | 19.20 |
| 11 | 100.98 | 2.44 | 10.20 | 20.20 |
| 12 | 101.22 | 2.46 | 10.10 | 18.20 |
| 13 | 100.25 | 2.26 | 10.20 | 20.20 |
| 14 | 100.88 | 2.26 | 10.20 | 20.30 |
| 15 | 100.39 | 2.28 | 10.20 | 19.40 |
| 16 | 100.38 | 2.21 | 10.20 | 20.10 |
| 17 | 100.55 | 2.23 | 10.40 | 19.50 |
| 18 | 101.38 | 2.18 | 10.60 | 25.30 |
| 19 | 100.45 | 2.20 | 10.10 | 20.30 |
| 20 | 100.58 | 2.28 | 10.30 | 20.40 |
| MIN | 100.25 | 2.18 | 10.10 | 18.20 |
| MAX | 101.54 | 2.48 | 10.80 | 25.30 |
| AVE | 100.87 | 2.32 | 10.30 | 20.40 |

Comparative Embodiment 1

Similar to Embodiment 1, this comparative embodiment intends to manufacture 20 capacitors and analyze them. Specifications of the capacitors are 200V100 μF and the size of the capacitors is Φ16*26 mm. A difference between the manufacturing method in Embodiment 1 and this comparative embodiment is that step (3) is deleted and steps (2) to (4) are repeated five times. An analysis result of the capacitors is shown in Table 14.

TABLE 14

Performance test for capacitors manufactured in Comparative Embodiment 1

| Serial No. | CAP(uF) | DF(%) | ESR(mΩ)/100 kHz | LC(uA)/1 min |
| --- | --- | --- | --- | --- |
| 1 | 63.75 | 7.85 | 32.15 | 144.40 |
| 2 | 59.87 | 7.37 | 30.22 | 38.00 |
| 3 | 71.52 | 6.41 | 28.89 | 53.00 |
| 4 | 59.37 | 8.60 | 41.37 | 129.00 |
| 5 | 60.15 | 7.14 | 35.11 | 56.00 |
| 6 | 59.48 | 9.98 | 36.74 | 52.00 |
| 7 | 59.47 | 9.41 | 40.05 | 47.00 |
| 8 | 60.12 | 6.56 | 31.03 | 20.00 |
| 9 | 59.84 | 8.35 | 33.71 | 142.00 |
| 10 | 60.11 | 8.34 | 33.76 | 19.00 |
| 11 | 60.22 | 7.68 | 37.95 | 148.00 |
| 12 | 60.14 | 7.59 | 44.86 | 84.00 |
| 13 | 59.96 | 7.62 | 39.19 | 128.00 |
| 14 | 60.49 | 6.56 | 36.63 | 105.00 |
| 15 | 60.15 | 8.78 | 34.91 | 19.00 |
| 16 | 59.71 | 7.93 | 47.57 | 98.00 |
| 17 | 59.34 | 8.05 | 38.25 | 42.00 |
| 18 | 59.99 | 8.58 | 34.61 | 111.00 |
| 19 | 60.32 | 7.32 | 32.66 | 121.00 |
| 20 | 59.63 | 9.22 | 32.34 | 71.00 |
| MIN | 59.34 | 6.41 | 28.89 | 19.00 |
| MAX | 71.52 | 9.98 | 47.57 | 148.00 |
| AVE | 60.68 | 7.97 | 36.10 | 81.37 |

Comparative Embodiment 2

Similar to Embodiment 1, this comparative embodiment intends to manufacture 20 capacitors and analyze them. Specifications of the capacitors are 200V100 μF and the size of the capacitors is Φ16*26 mm. A difference between the manufacturing method in Embodiment 1 and this comparative embodiment is that steps (3) and (5) are deleted and an impregnation time in step (2) is 30 minutes. An analysis result of the capacitors is shown in Table 15.

TABLE 15

Performance test for capacitors manufactured in Comparative Embodiment 2

| Serial No. | CAP(uF) | DF(%) | ESR(mΩ)/100 kHz | LC(uA)/1 min |
|---|---|---|---|---|
| 1 | 80.54 | 6.28 | 28.40 | 116.00 |
| 2 | 80.16 | 6.68 | 37.50 | 37.00 |
| 3 | 82.64 | 6.49 | 28.20 | 27.00 |
| 4 | 80.13 | 5.92 | 22.00 | 53.00 |
| 5 | 79.43 | 6.30 | 29.00 | 128.00 |
| 6 | 79.21 | 6.44 | 28.00 | 70.00 |
| 7 | 81.63 | 6.10 | 21.00 | 112.00 |
| 8 | 81.89 | 6.01 | 27.50 | 46.00 |
| 9 | 81.05 | 5.79 | 18.00 | 53.00 |
| 10 | 81.55 | 5.85 | 32.90 | 34.00 |
| 11 | 82.43 | 5.60 | 23.40 | 70.00 |
| 12 | 81.38 | 5.73 | 27.90 | 112.00 |
| 13 | 82.27 | 6.33 | 22.70 | 23.00 |
| 14 | 82.34 | 5.63 | 19.40 | 31.00 |
| 15 | 78.72 | 5.94 | 32.40 | 76.00 |
| 16 | 80.04 | 5.59 | 30.20 | 36.00 |
| 17 | 80.23 | 5.79 | 21.70 | 68.00 |
| 18 | 79.41 | 5.86 | 25.40 | 43.00 |
| 19 | 80.32 | 6.09 | 25.90 | 94.00 |
| 20 | 81.74 | 5.91 | 18.30 | 26.00 |
| MIN | 78.72 | 5.59 | 18.00 | 23.00 |
| MAX | 82.64 | 6.68 | 37.50 | 128.00 |
| AVE | 80.86 | 6.02 | 25.99 | 62.75 |

Comparative Embodiment 3

Specifications of capacitors are 16V 3300 uF 18*36.5 mm, and a detailed method for manufacturing the capacitors is as follows:

(1) Winding electrolytic paper between an anodized aluminum foil and a cathode foil into a capacitor core.

(2) Welding the capacitor core onto an iron bar, and impregnating it in a forming agent to make the forming agent just submerge the capacitor core. Applying a 32V voltage, and performing chemical repair treatment for the two anodized aluminum foils simultaneously for 10 minutes.

(3) Perform carbonization treatment on the capacitor core for 20 minutes at a temperature of 300±10° C.

(4) Repeating steps (2) and (3) four times.

(5) Placing the capacitor core into monomers separately for impregnating. The impregnation continues for 6 minutes during which at least ⅔ of the capacitor core is under a liquid level of an impregnating fluid. After completion of the impregnation, removing the solvent.

(6) Placing the capacitor core in an oxidant for impregnating. During the impregnation, the capacitor core is fully under the liquid level of the impregnating fluid. An impregnation method is: Impregnating the capacitor core, inside which an atmospheric pressure exists, in the oxidant for 2 minutes, and then taking the capacitor core out of the oxidant, creating a vacuum to reach a vacuum degree lower than 90 KPa, and keeping this state for 2 minutes, whereupon depressurization is performed to an atmospheric pressure. Feeding compressed air until the pressure is 3 atm, and impregnating the capacitor core in the oxidant for 5 minutes, whereupon the impregnation is completed.

(7) Performing two sections of polymerization on the impregnated capacitor core: First, performing low-temperature polymerization for 200±10 minutes at a polymerization temperature of 50±10° C.; and then performing high-temperature polymerization for 100±10 minutes at a polymerization temperature of 150±10° C.

(8) Aging treatment and test sorting: Applying a 0.5× rated voltage, a 1× rated voltage, and a 1.2× rated voltage to one electrode of each capacitor separately to perform aging treatment, and then applying 0.5× rated voltage, a 1× rated voltage, and a 1.2× rated voltage to the other electrode of the capacitor separately to perform aging treatment.

After the aging is completed, 20 capacitors are taken as samples for testing. On average, CAP(uF) is 3312, DF (%) is 3.3, ESR(mΩ)/100 kHz is 6.3, and LC(uA)/1 min is 153.

This comparative embodiment uses a solvent-based solvent used as a monomer and an oxidant. In the impregnation process, surface tension of the solvent is small, the solvent can penetrate into pores of the formed foil, and conductive polymers are generated in the pores. In the pores, there are many defects on an oxide film, and the conductive polymers exist, thereby causing a high leakage current. In addition, the conductive polymers are hardly repairable. Therefore, after the high leakage current is generated, a short circuit may occur, and it is difficult to increase the voltage of the product.

Comparative Embodiment 4

An anodized foil, a cathode foil, and electrolytic paper and specifications thereof, which are used in a capacitor manufacturing method in this comparative embodiment are the same as those in Embodiment 5. Specifications of manufactured capacitors are 200V100 μF, and the size of the capacitors is Φ16*26 mm. The detailed manufacturing method is as follows:

(1) Winding electrolytic paper between an anodized aluminum foil and a cathode foil into a capacitor core.

(2) Placing the capacitor core in a temperature of 300° C. for carbonization treatment, and removing ash content; then placing the capacitor core in a 7% ammonium adipate solution, and applying a 9V voltage for 15 minutes for repairing the damaged oxide film.

(3) Making the oxidant P-toluenesulfonic acid iron into a 40~60% alcohol solution, impregnating the capacitor core treated in step (2) into the alcohol solution for 3~6 minutes, taking the capacitor core out and drying it in a temperature of 60~70° C. to remove the alcohol solution.

(4) Making the monomer (3,4-ethylene dioxythiophene) into a 40~55% alcohol solution, impregnating the capacitor core, which has been impregnated in the oxidant and dried, in the alcohol solution of the monomer for 2~4 minutes. Taking the capacitor core out and drying it in a temperature of 60~70° C. to remove the alcohol solution. Raising the temperature to 110~120° C. to trigger a polymerization reaction and form a polymer conductive layer.

(5) Sealing the capacitor core with sealing rubber and placing it in an aluminum cover. Applying an aging voltage for 100 minutes to obtain a solid electrolyte aluminum-electrolytic capacitor.

After completion of the aging, 20 samples are taken for testing, the result of which is shown in Table 16.

TABLE 16

Performance test for capacitors manufactured in Comparative Embodiment 4

| Serial No. | CAP(uF) | DF(%) | ESR(mΩ)/100 kHz | LC(uA)/1 min |
|---|---|---|---|---|
| 1 | 96.60 | 2.93 | 45.80 | — |
| 2 | 96.69 | 3.39 | 48.40 | — |
| 3 | 98.24 | 3.28 | 48.90 | — |
| 4 | 97.06 | 2.16 | 38.00 | — |
| 5 | 95.52 | 3.39 | 48.50 | — |
| 6 | 95.68 | 2.77 | 48.70 | — |
| 7 | 98.22 | 2.70 | 46.50 | — |

TABLE 16-continued

Performance test for capacitors manufactured
in Comparative Embodiment 4

| Serial No. | CAP(uF) | DF(%) | ESR(mΩ)/100 kHz | LC(uA)/1 min |
|---|---|---|---|---|
| 8 | 98.45 | 2.72 | 48.37 | — |
| 9 | 95.12 | 2.79 | 48.70 | — |
| 10 | 95.45 | 2.75 | 48.40 | — |
| 11 | 96.80 | 2.91 | 46.80 | — |
| 12 | 97.47 | 2.39 | 48.70 | — |
| 13 | 95.58 | 3.47 | 45.80 | — |
| 14 | 97.11 | 3.02 | 47.80 | — |
| 15 | 95.49 | 2.74 | 47.50 | — |
| 16 | 95.32 | 3.59 | 48.20 | — |
| 17 | 96.68 | 2.71 | 48.70 | — |
| 18 | 96.01 | 2.27 | 48.60 | — |
| 19 | 96.47 | 2.89 | 48.60 | — |
| 20 | 96.37 | 2.56 | 48.20 | — |
| MIN | 95.12 | 2.16 | 38.00 | — |
| MAX | 98.45 | 3.59 | 48.90 | — |
| AVE | 96.52 | 2.87 | 47.46 | — |

Note:
Because the withstand voltage of the product manufactured in the method in Comparative Embodiment 4 is deficient, the aging treatment cannot be performed, and the leakage current cannot be tested.

According to the embodiments and the comparative embodiments, in the present invention, when the capacitor core is impregnated in the dispersion A under multiple pressure conditions such as atmospheric pressure, vacuum and pressurization, the electrolyte in the dispersion A can more sufficiently generate a stable conductive polymer layer on the surface of the foil, thereby improving electrical performance of the capacitor. In addition, as a solid electrolyte, the polymer dispersion A can effectively increase the withstand voltage of the solid electrolyte aluminum-electrolytic capacitor. The impregnation steps are repeated many times, and by means of heat treatment, the impregnating solvent is removed out of the capacitor core, which is conducive to absorption of an impregnating fluid in next impregnation. In this way, a high-voltage solid electrolyte aluminum-electrolytic capacitor of a lower ESR value can be obtained, the capacitance withdrawing rate is improved, and product consistency is improved while loss is reduced. Especially in a (vacuum impregnation+low temperature drying)→(pressurized impregnation+low temperature drying)→(atmospheric pressure impregnation+low temperature drying+high temperature drying) cyclic impregnation process, the conductive polymer in the impregnating fluid can be better absorbed next time, the ESR of the manufactured capacitor is lower, the capacitor core can be impregnated more thoroughly, and a stable conductive polymer layer can be obtained.

In manufacturing the capacitors, the impregnation is performed in a vacuum state in order to extract air out of the electrolytic paper, the foil surface, and the foil pores, vacate space for adsorption of the dispersion A, and adsorb more of the dispersion A. If bubbles exist on the foil surface, the bubbles prevent adsorption of the dispersion A and affect integrity of a film that is formed by the dispersion A on the foil surface after drying, thereby affecting product performance. In addition, the vacuum can take away the bubbles in the dispersion A, thereby improving a permeation effect of the dispersion A.

After being impregnated in the vacuum, the capacitor core enters an atmospheric pressure state. Therefore, by virtue of air pressure, the capacitor core impregnated in the dispersion A is further permeated under an atmospheric pressure. The principles of pressurization are the same. That is, relative to the vacuum, a greater pressure difference exists, so that the capacitor core impregnated in the dispersion A is impregnated more thoroughly, and more of the dispersion A is adsorbed.

Different pressures are generated under the three different pressure states: vacuum, atmospheric pressure, and pressurization. With the pressure increased gradually, the capacitor core is impregnated more thoroughly.

For large-sized capacitors such as Φ16*26, because the capacitor core is larger, the dispersion A passes through a longer path and penetrates the capacitor core more difficultly, and it is difficult to accomplish the impregnation effect of the capacitor core if the pressure condition is merely a combination of the vacuum and the atmospheric pressure or a combination of pressurization and the atmospheric pressure, which also affects product performance to some extent.

In Embodiment 11, Embodiment 12, and Embodiment 13, a carbon material of higher conductivity is added in the conductive polymer electrolyte to increase electrical conductivity of the conductive polymer. After the electrical conductivity of the solid electrolyte is increased, the equivalent series resistance (ESR) of the product is decreased directly, and the product loss is reduced to some extent. Products may slightly vary with different adding conditions such as concentration and impregnation order, and optimization may be performed by means of repeated tests. From Embodiment 5, it can be seen that for lack of a carbon material used for increasing electrical conductivity, the equivalent series resistance is higher, and the loss is slightly increased.

To accomplish optimum performance of the solid electrolyte aluminum-electrolytic capacitor, the present invention provides process optimization and improvement, which is described below with reference to an orthogonal optimization experiment. The orthogonal optimization experiment includes 7 factors and 3 levels, and is carried out 18 times. After the aging, 20 samples were taken for testing, and test results were averaged. See Table 17 for details.

TABLE 17

Factors, levels and performance test in orthogonal optimization experiment

| | Vacuum degree/pa | Vacuum-impregnation time/min | Pressure/MPa | Pressurization-impregnation time/min | Low temperature drying-time/min | High temperature drying-time/min | Repeat times/times | Performance test | | | |
|---|---|---|---|---|---|---|---|---|---|---|---|
| | | | | | | | | CAP (uF) | DF (%) | ESR (mΩ)/100 kHz | LC(uA)/1 min |
| Embodiment 14 | 700 | 1 | 0.3 | 1 | 30 | 10 | 3 | 46.34 | 7.23 | 51.19 | 1.56 |
| Embodiment 15 | 700 | 5 | 0.5 | 5 | 60 | 30 | 5 | 69.53 | 8.11 | 34.37 | 14.33 |
| Embodiment 16 | 700 | 10 | 0.8 | 10 | 90 | 60 | 10 | 100.11 | 2.55 | 13.33 | 19.32 |
| Embodiment 17 | 850 | 1 | 0.3 | 5 | 60 | 60 | 10 | 81.30 | 6.22 | 26.97 | 10.23 |
| Embodiment 18 | 850 | 5 | 0.5 | 10 | 90 | 10 | 3 | 100.14 | 2.73 | 14.18 | 23.60 |

TABLE 17-continued

Factors, levels and performance test in orthogonal optimization experiment

| | Vacuum degree/ pa | Vacuum-impregnation time/min | Pressure/ MPa | Pressurization-impregnation time/min | Low temperature drying-time/min | High temperature drying-time/min | Repeat times/ times | Performance test | | | |
|---|---|---|---|---|---|---|---|---|---|---|---|
| | | | | | | | | CAP (uF) | DF (%) | ESR (mΩ)/ 100 kHz | LC(uA)/ 1 min |
| Embodiment 19 | 850 | 10 | 0.8 | 1 | 30 | 30 | 5 | 100.52 | 2.09 | 13.54 | 22.15 |
| Embodiment 20 | 900 | 1 | 0.5 | 1 | 90 | 30 | 10 | 84.54 | 6.09 | 23.78 | 15.60 |
| Embodiment 21 | 900 | 5 | 0.8 | 5 | 30 | 60 | 3 | 93.56 | 3.95 | 17.80 | 11.75 |
| Embodiment 22 | 900 | 10 | 0.3 | 10 | 60 | 10 | 5 | 96.63 | 2.95 | 16.13 | 15.40 |
| Embodiment 23 | 700 | 1 | 0.8 | 10 | 60 | 30 | 3 | 92.84 | 4.66 | 16.83 | 7.10 |
| Embodiment 24 | 700 | 5 | 0.3 | 1 | 90 | 60 | 5 | 70.63 | 6.74 | 28.11 | 6.82 |
| Embodiment 25 | 700 | 10 | 0.5 | 5 | 30 | 10 | 10 | 97.80 | 1.78 | 13.80 | 12.61 |
| Embodiment 26 | 850 | 1 | 0.5 | 10 | 30 | 60 | 5 | 93.44 | 4.03 | 16.76 | 17.05 |
| Embodiment 27 | 850 | 5 | 0.8 | 1 | 60 | 10 | 10 | 92.43 | 3.77 | 18.14 | 17.70 |
| Embodiment 28 | 850 | 10 | 0.3 | 5 | 90 | 30 | 3 | 97.87 | 2.84 | 13.43 | 15.95 |
| Embodiment 29 | 900 | 1 | 0.8 | 5 | 90 | 10 | 5 | 94.27 | 3.53 | 15.20 | 13.56 |
| Embodiment 30 | 900 | 5 | 0.3 | 10 | 30 | 30 | 10 | 98.50 | 2.73 | 13.59 | 14.46 |
| Embodiment 31 | 900 | 10 | 0.5 | 1 | 60 | 60 | 3 | 96.50 | 3.36 | 14.68 | 16.81 |

This orthogonal experiment is not orthogonality of all conditions, but seven major factors are selected for studying. An actual production process may be determined according to a trade-off between performance and efficiency, where the trade-off is achieved with reference to regularity shown in this table, actual production conditions and production efficiency.

From this orthogonal experiment, it can be seen that the vacuum degree should be moderate. If the vacuum degree is too low, air may be not exhausted thoroughly from the capacitor core, and adsorption of the dispersion A is impaired. If the vacuum degree is too high, moisture in the dispersion A may be lost, a viscosity may increase, and the actual impregnation effect may be affected. It is the same with the vacuum impregnation time. If the impregnation time is too short, the impregnation is not sufficient, and the impregnation effect can be improved by increasing the impregnation time. However, if the impregnation time is longer than a specific value, the improvement is not obvious, and a too long impregnation time results in a high viscosity of the dispersion A and impairs the impregnation effect in a next cycle.

The increased impregnation pressure improves the impregnation effect significantly, and a longer pressurized impregnation time leads to a higher impregnation effect. However, taking safety into account, the pressure stops increasing in a practicable range.

The purpose of low temperature drying is to discharge moisture in the dispersion out of the capacitor core slowly. A too high temperature that leads to water boiling affects formation of a polymer film of the dispersion on the foil surface, and a too low temperature affects the speed of discharge. A longer drying time improves the effect of moisture discharge, but a too long drying time does not significantly increase the effect but decreases production efficiency. The purpose of high temperature drying is to further remove moisture out of the capacitor core. Temperature selection is restricted by equipment. A proper high temperature drying time should be selected. A too long drying time brings no effect, but may impair the product.

Currently, because solid content of the dispersion is low, impregnation is performed repeatedly to increase the retained amount of polymers. The test results show that the effect of performance improvement is not obvious once the number of times of repeating the impregnation increases to a specific value. The experiment is performed only with respect to the current solid content of the dispersion. The number of times of impregnation varies with the solid content. The number of times of impregnation may be smaller if the solid content is higher.

The foregoing has described in detail a method for manufacturing a high-voltage solid electrolyte aluminum-electrolytic capacitor disclosed in the embodiments of the present invention. The principle and implementation of the present invention are described herein through specific examples. The description about the embodiments of the present invention is merely provided to help understand the method and core ideas of the present invention. In addition, a person of ordinary skill in the art can make variations and modifications to the present invention in terms of the specific implementations and application scopes according to the ideas of the present invention. Therefore, the content of specification shall not be construed as a limitation on the present invention.

The invention claimed is:

1. A method for manufacturing a solid electrolyte aluminum-electrolytic capacitor, comprising:
   (1) welding a capacitor core of a capacitor onto an iron bar, applying a voltage for chemical treatment, and after the chemical treatment, washing and drying the capacitor core;
   (2) impregnating the dried capacitor core in a dispersion B for 1~30 minutes;
   (3) removing the capacitor core out of the dispersion B, creating a vacuum and then impregnating the capacitor core in the dispersion B for 1~10 minutes;
   (4) keeping the capacitor core in the dispersion B, breaking the vacuum and then performing pressurization, and keeping the pressurized state for 1~10 minutes;
   (5) keeping the capacitor core in the dispersion B, performing depressurization to an atmospheric pressure, and keeping the atmospheric pressure for 1~10 minutes;
   (6) taking the capacitor core out, placing the capacitor core in a temperature of 50~100° C. and drying it for 20~60 minutes, and then placing the capacitor core in a temperature of 110~200° C. and drying it for 20~60 minutes;
   (7) impregnating the dried capacitor core in a dispersion C for 1~30 minutes;
   (8) taking the capacitor core out, placing the capacitor core in a temperature of 65~100° C. and drying it for 20~60 minutes, and then placing the capacitor core in a temperature of 135~165° C. and drying it for 20~60 minutes;

(9) Repeating steps (3) to (8) at least once;

(10) Putting the capacitor core in an aluminum cover and sealing it, and performing aging treatment to obtain a solid electrolyte aluminum-electrolytic capacitor, wherein the dispersion B is a dispersion inclusive of both a conductive polymer and a conductive carbon material; the dispersion C is a dispersion inclusive of a conductive carbon material.

2. The method for manufacturing a high-voltage solid electrolyte aluminum-electrolytic capacitor according to claim 1, wherein a vacuum degree of the vacuum created in step (3) is 700~970 Pa.

3. The method for manufacturing a high-voltage solid electrolyte aluminum-electrolytic capacitor according to claim 1, wherein the pressurizing in step (4) refers to feeding compressed air until 0.1~0.6 MPa.

4. The method for manufacturing a high-voltage solid electrolyte aluminum-electrolytic capacitor according to claim 1, wherein step (9) is to repeat steps (3) to (8) five times.

5. The method for manufacturing a high-voltage solid electrolyte aluminum-electrolytic capacitor according to claim 1, wherein the drying in step (1) is specifically: drying the capacitor core in a low temperature of 50~100° C. for 20~100 minutes first, and then drying it in a high temperature of 110~200° C. for 20~60 minutes.

6. The method for manufacturing a high-voltage solid electrolyte aluminum-electrolytic capacitor according to claim 1, wherein the drying in step (1) is specifically: drying the capacitor core in a low temperature of 50~100° C. for 20~100 minutes first, and then drying it in a high temperature of 110~200° C. for 20~60 minutes.

* * * * *